United States Patent [19]

Singletary et al.

[11] 4,346,749
[45] Aug. 31, 1982

[54] MOTOR AND ROLLER SUPPORT FOR WINDOW SHADES AND THE LIKE

[75] Inventors: Buckley A. Singletary, Plainfield; John C. Gall, Chicago, both of Ill.

[73] Assignee: Sears, Roebuck and Company, Chicago, Ill.

[21] Appl. No.: 179,323

[22] Filed: Aug. 18, 1980

[51] Int. Cl.³ .............................................. E06B 9/208
[52] U.S. Cl. ..................................... 160/301; 188/82.7; 192/16; 192/55
[58] Field of Search ............... 160/291, 292, 293, 294, 160/300, 301, 305, 306, 323, 324, 325, 326, 296, 299; 188/82.1, 82.2, 82.7, 82.77; 192/14, 15, 16, 43, 46, 55; 64/30 D

[56] References Cited

U.S. PATENT DOCUMENTS

| 5,439 | 6/1873 | Tripp . | |
|---|---|---|---|
| 94,866 | 9/1869 | Burns | 160/301 |
| 179,319 | 6/1876 | Johnston | 160/306 |
| 185,763 | 12/1876 | Lake . | |
| 256,736 | 4/1882 | Putnam . | |
| 280,249 | 6/1883 | Shaw . | |
| 301,771 | 7/1884 | Sturgeon . | |
| 422,314 | 2/1890 | Peters . | |
| 538,196 | 4/1895 | Lidback . | |
| 844,808 | 2/1907 | Kendall | 188/82.1 |
| 1,010,574 | 12/1911 | Bird et al. | 192/16 |
| 1,122,938 | 12/1914 | Jackson . | |
| 1,514,182 | 11/1924 | Stec . | |
| 1,681,767 | 8/1928 | Goodman et al. . | |
| 1,726,393 | 8/1929 | Goodman . | |
| 1,827,444 | 10/1931 | Tomlinson . | |
| 2,012,261 | 8/1935 | Drumm . | |
| 2,134,405 | 10/1938 | Hulshizer | 188/82.77 |
| 2,586,340 | 2/1952 | Hyde . | |
| 3,115,927 | 12/1963 | Znamirowski . | |
| 3,200,918 | 8/1965 | Horn | 192/46 |
| 3,490,715 | 1/1970 | Nicpon . | |
| 3,589,486 | 6/1971 | Kelch | 192/55 |
| 3,763,916 | 10/1973 | Gossling | 160/318 |
| 4,009,745 | 3/1977 | Erpenbeck | 160/297 |
| 4,096,904 | 6/1978 | Donofrio | 160/299 |
| 4,123,197 | 10/1978 | Keem et al. | 188/82.77 |
| 4,125,142 | 11/1978 | Fohl | 190/291 |

Primary Examiner—Peter M. Caun
Attorney, Agent, or Firm—Arnstein, Gluck & Lehr

[57] ABSTRACT

A motor and roller support includes a reversible lock clutch mechanism having a housing including an annular portion having a plurality of alternately deep and shallow recesses and a spindle axially received in the housing and having at least one flexible pawl positioned to cooperate with the plurality of recesses of the housing, with the pawl being unflexed when radially aligned with any of the deep recesses of the housing, and being angularly flexed upon being positioned in any of the shallow recesses of the housing. Upon alignment of the pawl with any of the deep recesses of the housing, relative rotation between the housing and the spindle can be initiated in either direction. However, upon the pawl being positioned with its end residing in a shallow recess of the housing and abutting the recess surface, relative rotation between the housing and the spindle can be initiated in only one direction therefrom. In the motor and roller support, the housing is adapted to engage a terminal portion of a roller and the spindle has means for engaging a supporting bracket extending from one end of the spindle outwardly of the housing, the means for engaging a motor, such as a spring motor. The motor and roller support is useful for supporting a strip, such as a window shade, a screen, and the like, secured to a roller for rolling and unrolling with respect to the roller.

24 Claims, 9 Drawing Figures

MOTOR AND ROLLER SUPPORT FOR WINDOW SHADES AND THE LIKE

FIELD OF THE INVENTION

This invention relates to motor and roller support apparatus for strip-like materials, such as window shades, screens, roll-top closures and the like, and to a clutch mechanism used therein. More particularly, the invention relates to an improved motor and roller support and to a clutch mechanism which is easily assembled and may comprise as few as two parts.

BACKGROUND OF THE INVENTION

The use of motor assemblies actuated by a spring has been known for at least approximately 100 years for window shades. Typically these assemblies utilized clutch mechanisms requiring free-floating balls or pawls or pivotally mounted pawls, often controlled by centrifugal force generated by rapid rotation of the shade roller. Alternatively, several devices utilized a slow movement to permit a latching action, whereas rapid movement of the roller retained an unlatched condition. These mechanisms typically required numerous components to be assembled to form the clutch or racheting arrangement between the rotating portion, normally fixed to the roller, and the non-rotating part.

For example, U.S. Pat. No. 256,736, issued to W. P. Putnam on Apr. 18, 1882, discloses the use of a spring motor mechanism having a pawl pivotally mounted on a collar on the spindle. A latching action was accomplished by a combination of centrifugal action and a lifting lug when the shade was wound or unwound rapidly. U.S. Pat. No. 301,771, issued to J. C. Sturgeon on July 8, 1894, similarly discloses the use of a spring motor mechanism, but has a pawl mounted on the spear and provides rachet type notches in the outer flange of the roller end-cap. Latching action was accomplished in the device by gravity acting upon the pawl to engage the rachet teeth.

U.S. Pat. No. 1,681,767, issued to J. Goodman et al., on Aug. 21, 1928, utilizes free-floating pawls with a notched stud or stationary member, to which the pawls hook upon slow rotation of the roller in one direction, but against which the pawls do not hook or latch upon rapid rotation in either direction or slow rotation in the opposite direction.

U.S. Pat. No. 3,115,927, issued to H. Znamirowski, on Dec. 31, 1963, discloses a pivoted pawl arrangement requiring the assembly of numerous small parts to obtain a pawl and ratchet mechanism which operates due to gravity and centrifugal force. U.S. Pat. Nos. 2,586,340; 3,763,916 and 4,009,745 are exemplary of patents utilizing balls in conjuction with recesses wherein the latching action is accomplished by the use of gravity and centrifugal force.

In all of the aforementioned patents, a multiplicity of parts were required which complicated the assembly of the motor and added to the cost of its manufacture. In addition, shades utilizing these devices were often inconsistent in operation and frequently could not be positioned at a desired level except with difficulty and repeated attempted latching operations.

Therefore, it is one object of the present invention to provide a motor and roller support and clutch mechanism of simplified construction, which is easily and inexpensively manufactured from only a few parts.

It is another object of this invention to provide a simplified clutch mechanism employing a housing and spindle having a pawl secured thereto, thus eliminating free-floating balls, pivoting pawls or other small parts as heretofore required.

Still another object of this invention is the provision of a simplified motor construction employing a unified spindle, pawl and bracket engaging element which eliminates difficulty assembled small parts, such as balls and free-floating or pivoted pawls.

These and other objects and advantages of the present invention will become apparent from the following description when the same is considered in conjuction with the accompanying drawings.

SUMMARY OF THE INVENTION

In general, the objects and advantages of the present invention are met by providing a clutch mechanism having a housing including an annular portion having a plurality of alternately deep and shallow recesses formed in the inner surface of the periphery of the annular portion, and a spindle axially received in the housing and having at least one flexible pawl extending from the spindle; and by providing a motor and roller support for rolling and unrolling a strip incorporating the clutch mechanism, wherein the housing is adapted to engage a terminal portion of a roller and the spindle integrally has bracket-engaging means extending from one end of the spindle outwardly of the housing for supporting the roller. The motor and roller support is particularly useful with such strip materials as window shades, screens including projection screens, roll-tops, such as tambour covers for roll-top desks, and the like.

The spindle, preferably adjacent its end opposite to its integral bracket-engaging means, includes means for rotatably retaining the spindle in the housing. The spindle further has motor spring engaging means, preferably at or adjacent its end opposite the bracket-engaging means, for cooperatively engaging a motor spring.

The flexible pawl extending from the spindle is positioned to cooperate with the plurality of recesses of the annular portion of the housing with the pawl being unflexed, i.e. relaxed, when radially aligned with any of the deep recesses in the housing. When so aligned relative motion between the housing and the spindle can be initiated in either direction therefrom. In such rotation, the pawl is deflected by the portions of the housing which include the shallow recesses and shoulders intermediate the shallow recesses and adjacent deep recesses. Upon the halting of the rotation with the end of the pawl residing in a shallow recess of the housing, the pawl is latched against the recess surface, providing the spring tension of a motor spring or other resistance, is in the proper direction. The recess surface of the shallow recess may have a ramp portion at one end for this purpose merging into a shoulder adjacent an adjacent deep recess, thereby preventing rotation in the opposite direction until the pawl is unlatched. Unlatching is effected by a slight rotation in the direction of rotation prior to latching, to again position the end of the pawl in a deep recess which permits rotation in either direction.

The flexible pawl extending from the spindle in the present invention is preferably formed of flexible material, such as metallic spring-like materials, for example, beryllium-copper alloy, spring steel and the like, and polymeric materials, for example, polypropylene, polyethylene, and the like.

The cross sectional area of the pawl can be selected to provide the flexibility required for the pawl to be readily deflected by the shallow recess and shoulder portions of the housing. Alternatively, a pawl of generally greater cross-section can be employed by providing in the pawl at least one portion of reduced thickness, for example, in the nature of a score line in one or both sides of the pawl. The pawl can be integral with the spindle, in which case the spindle is preferably of the same material as the pawl. The pawl can also be formed of a separate part, for example, a generally flat strip of the flexible material, which can be easily assembled to the spindle by placing the strip into a slot or hole formed in the spindle, most conveniently formed along a diameter of the spindle, and thereby appear and function as if it was integral therewith. Additionally, the pawl can have a pair of spaced apart transverse portions of reduced cross-section, whereby the pawl may flex simultaneously in two directions to enhance the flexibility of the pawl. Although one pawl may be utilized, for convenience of manufacture and ease of operation, it is desirable to employ a pair of pawls extending from diametrically opposed portions of the spindle.

The motor and roller support of the present invention is particularly advantageous because it can be readily assembled from relatively few parts, and the spring and motor assembly can be wound before shipment without unwinding during shipment and handling. In addition, less strip material is required with the motor and roller support of this invention as the strip need not be pulled or unwound substantially beyond the desired position or setting to effect the latching and unlatching operations.

DESCRIPTION OF THE PREFERRED EMBODIMENTS

Figure 1:
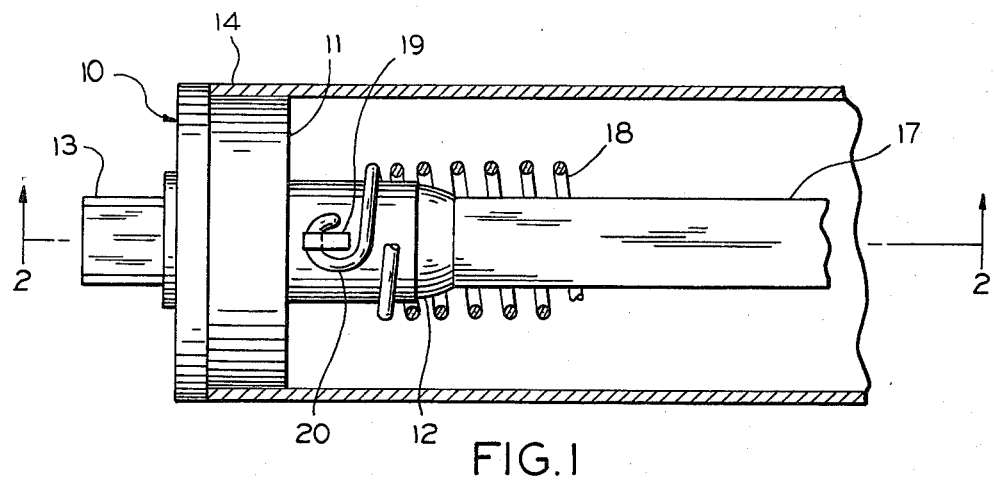
FIG. 1 is a fragmentary, partially cross-sectional view of an improved clutch mechanism and the motor and roller support, with a roller tube, in accordance with the present invention.

Referring to the drawings, the numeral 10 indicates generally the clutch mechanism which is incorporated into the motor and roller support of the present invention, which will be described in its particular use as a window shade support, it being understood that for other uses particular elements may have a different shape and be described by different terms. The mechanism generally comprises a housing 11 and a spindle 12 axially received in the housing. In the embodiment shown, spindle 12 terminates at one end in a bracket-engaging element such as spear 13 extending from one end of the spindle outwardly of housing 11. Spear 13 is adapted to engage and be supported by a slotted window shade bracket as is commonly known to the art.

Housing 11 in this embodiment is adapted to engage window shade roller or tube 14. In its simplest form, housing 11 and tube 14 may be sized to form a close fit upon assembly to prevent relative motion therebetween. Various types of fasteners or adhesives may be used to further prevent relative movement between the housing and tube.

Figure 2:
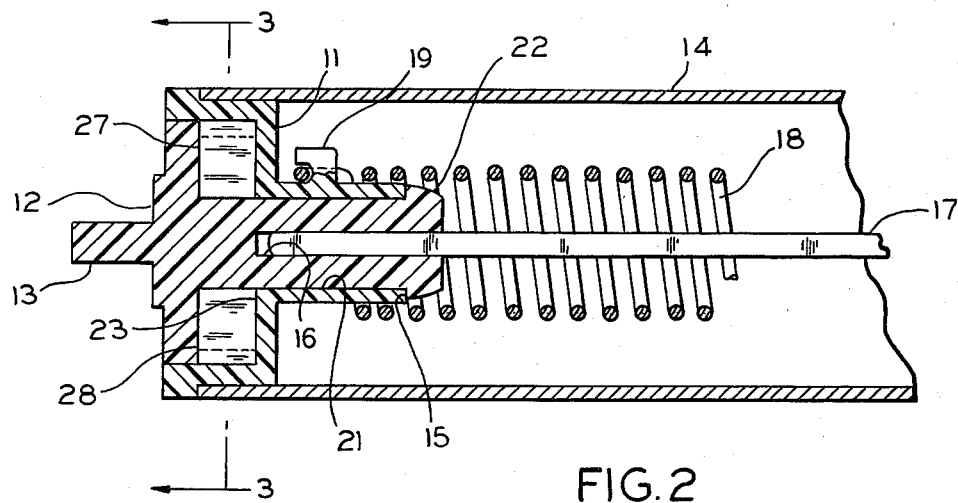
FIG. 2 is a fragmentary sectional view taken along the line 2—2 of FIG. 1.

Spindle 12 has means for rotatably retaining the spindle in housing 11, for example, an annular shoulder 15 as best shown in FIG. 2. Alternatively other means can be used to retain spindle 12, for example, a C-ring or a threaded portion and lock nut (not shown). In the embodiment shown in FIGS. 1 and 2, spindle 12 is slotted along a diameter to form slot 16 which serves the dual purpose of permitting the end of spindle 12 including shoulder 15 to be compressed during assembly to housing 11 and thereafter to engage a spring stick 17. Spring stick 17 and its retaining connection to motor spring 28 are known to the art, for example, in U.S. Pat. No. 3,115,927, cited herein, and need not be further described. Housing 11 further includes means for engaging one end of the spring, for example, by having a pin or hook 19 about which a hook 20 formed in the end of spring 18 may be engaged.

As part of the invention, it is contemplated that the mechanism can be easily assembled by passing the axially elongated portion of spindle 12 through the matching bore 21 of housing 11 and engaging the retaining means to rotatably retain the spindle to the housing. In the embodiment shown, spindle 12 can be readily inserted into bore 21 from left to right by having the tapered portion 22 of the slotted end of spindle 12 contact the annular corner 23 of housing 11 to compress the slotted end of the spindle as the spindle moves through the bore from left to right. Upon spindle 12 being firmly seated in housing 11, shoulder 15 passes beyond the end of bore 21 and moves outwardly upon the shoulder clearing the right end of housing 11, thereby retaining the spindle in the housing. The free end of spring stick 17 is then inserted into slot 16 of spindle 12 while the hooked end of motor spring 18 partially surrounds the axially elongated portion of housing 11. Hook 20 of the spring can then be placed into engagement with hook 19 of housing 11 so that the outward end (not shown) of spring 18 is operatively engaged with the spindle through spring stick 17 and the hooked end of spring 18 is engaged to housing 11 which is rotatable about the spindle.

In the present invention, housing 11 includes an annular portion 24 having a plurality of alternately deep recesses 25 and shallow recesses 26 formed in the inner surface of the periphery of portion 24. The number of recesses may be varied, but preferably housing 11 has at least four deep and four shallow recesses as shown in FIGS. 3, 4 and 6–9, and more preferably has six or eight of each type of recess for smoother operation.

Figure 3:
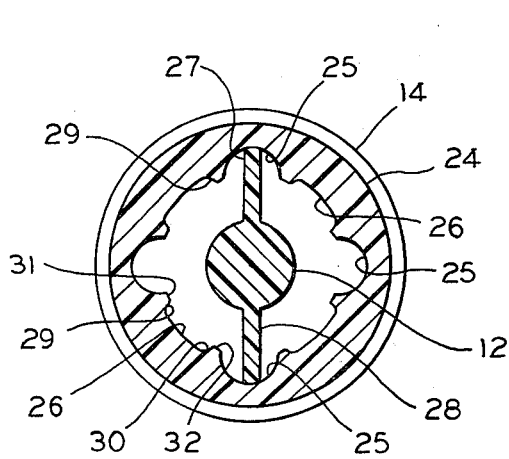
FIG. 3 is a cross-sectional view taken along line 3—3 of FIG. 2.
Figure 6:
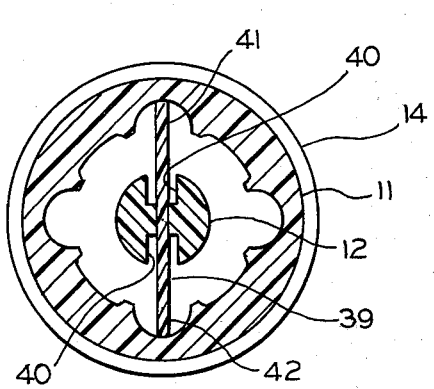
FIG. 6 is a view similar to FIG. 3 of a third embodiment of the present invention.
Figure 7:
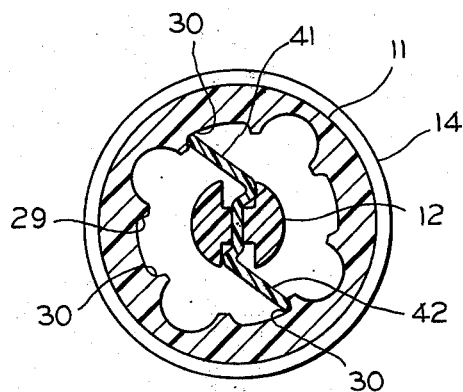
FIG. 7 is a view similar to FIG. 4 of the embodiment of the present invention illustrated in FIG. 6.

The present invention is further characterized by having at least one flexible pawl 27 extend from spindle 12, as best shown in FIG. 3. In the embodiment shown, pawl 27 and a second pawl 28 are integral with spindle 12 and extend radially therefrom at diametrically opposed portions of the spindle. Alternatively, pawls 27 and 28 can be formed of a single strip of flexible material inserted into an opening in spindle 12, for example, by extending slot 16 to the left in FIG. 2 and inserting the flexible strip therein to be retained in position by the end spring stick 17. This alternative is not shown in FIG. 3, although a similar embodiment is shown in FIGS. 6 and 7.

Figure 4:
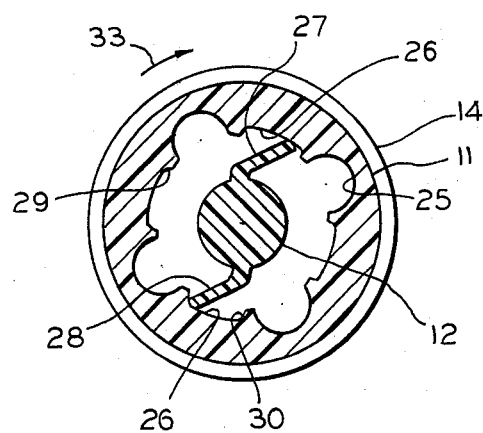
FIG. 4 is a view similar to FIG. 3 illustrating the housing and roller tube having been rotated with the pawls in a latched condition with respect to FIG. 3.

The length pawls 27 and 28 extend from spindle 12 is determined by the depths of recesses 25 and 26 as measured from the surface of the elongated portion of spindle 12. Thus, the depth of the recesses and the length of the pawls are selected so that the maximum depth of the deep recesses 25 as measured from spindle 12 is greater than the length of the pawl as measured from the spindle, while the maximum depth of the shallow recess as measured from spindle 12 is less than the length of the pawl as measured from the spindle. In this manner, pawls 27 and 28 can be fully extended and aligned with deep recesses 25 while being in a relaxed or unflexed condition, as illustrated in FIG. 3, but must be in an angularly flexed position when the end of the pawl resides in a shallow recess 26 as illustrated in FIG. 4.

Both the deep recesses 25 and the shallow recesses 26 have generally arcuate surfaces having ramp portions 29 and 30 at the end of the recess surfaces. Ramp portions 29 and 30, each merge into a shoulder, 31, 32, respectively, intermediate the adjacent deep recess 25. As shown in FIG. 4, upon rotation of housing 11, and hence roller or tube 14 in the direction of arrow 33, and halting the rotation of housing 11 with pawls 27 and 28 residing in shallow recesses 26, the ends of the pawls will abut ramps 29, particularly if spring 18 applies a force opposite to direction of arrow 33, such that the pawls are latched against the ramp portions 29. In this latched condition, the tube and housing may be rotated about spindle 12 in only one direction, i.e. in the direction of arrow 33. With a shade attached to the roller, and with the spindle held by a bracket engaging spear 13, the shade, tube 14 and housing 11 need be rotated only slightly in the direction of arrow 33 to position pawls 28 and 29 in the deep recesses 25 adjacent to the shallow recesses 26 in which the pawls reside and thereby unlatch the pawls from the shallow recesses. From the deep recesses, the shade, tube and housing may be rotated in either direction.

Figure 5:
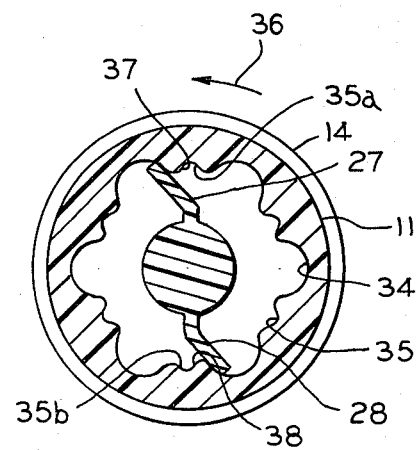
FIG. 5 is a view similar to FIG. 3 of another embodiment of the present invention.

In the embodiment shown in FIG. 5, annular portion of housing 11 has six deep recesses 34 and six shallow recesses 35, interspersed and equally spaced, formed in the periphery of the surface of the annular portion of housing 11. The same relationship between the maximum depths of the recesses and the length of the pawl as described with respect to the embodiment heretofore discussed is utilized in the present embodiment. The additional recesses in the annular portion of the housing in this embodiment provides for increased ease of operation of the motor and a reduction in the distance of rotation, and hence the length of strip, e.g. shade, which must be additionally unrolled, to effect the latching or unlatching of the motor mechanism. FIG. 5 illustrates the unlatched position of pawls 27 and 28 and the deflection of these pawls upon rotation of housing 11 and tube 14 in the direction arrow 36. Only slight additional rotation of housing 11 in the direction of arrow 36 will cause the ends of pawls 27 and 28 to reside in shallow recesses 35a and 35b, respectively, and latch by abutting against ramp portions 37 and 38, respectively, formed by the surface of the two recesses, each of which merge into a shoulder intermediate the adjacent deep recess 34.

In this latched condition, rotation of housing 11, and hence tube 14, in a direction opposite to arrow 36 is prevented, while rotation of the housing and tube in the direction of arrow 36 is permitted which initially will unlatch the pawls by presenting deep recesses to the ends of the pawls with which the pawls may then be aligned.

Still another embodiment of the present invention is illustrated in FIGS. 6 and 7. As in the description of the previous embodiment, elements which are identical to elements described in the first embodiment herein are referenced by the same numerals and are not further described. In this embodiment, spindle 12 is formed with a slot for a spring stick 17 as shown in FIG. 2 which is extended to permit a pawl strip member 39 to be inserted into the slot. Pawl strip member 39 can be held in position in the slot by having the strip member closely fit the sides of the slot, or by other means, and by having spring stick 17 bear against the exposed edge of the member. In this manner, spindle 12 can be formed of a different material, as compared to the flexible pawl strip member, as heretofore described. The slot in which pawl strip member 39 resides may be of uniform width (not shown), in which case the portions of pawl strip member 39 extending from spindle 12 operate in the same manner as pawls 27 and 28 in the embodiment first described above, and need not be described further.

However, in the embodiment shown in FIGS. 6 and 7, spindle 12 includes an additional slot 40 having a greater width than the slot in spindle 12 in which member 39 is positioned, and permits a double flexing of the portions of strip member 39 extending from the first slot which serve as pawls 41 and 42. The sides of slot 40 limit the flexing of pawls 41 and 42, and provide a support for the flexed portion of the pawl when the pawl is latched to a ramp portion 29 or 30, as illustrated in FIG. 7. As shown, upon latching in the manner described in the previous embodiments, the force of the motor spring acting upon the pawl between the ramp portion 29 or 30 and the spindle is not resisted only by the pawl at its junction with spindle 12 as shown in FIG. 4, but in this embodiment the pawl also abuts against a side of slot 40 of spindle 12 thereby reducing the strain on the junction between the pawl or pawl strip member 39 and spindle 12.

Figure 8:
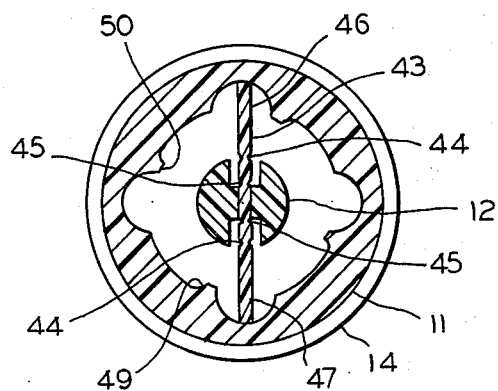
FIG. 8 is a view similar to FIG. 3 of a fourth embodiment of the present invention.
Figure 9:
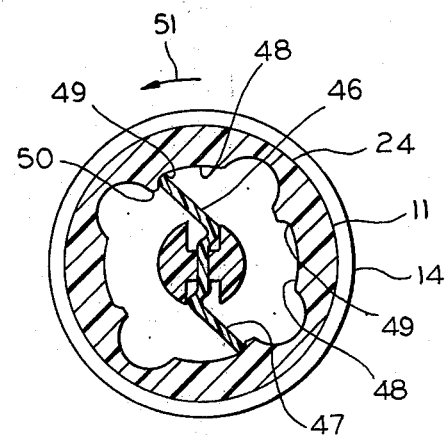
FIG. 9 is a view similar to FIGS. 4 and 7 of the embodiment of the invention illustrated in FIG. 8.

In another embodiment illustrated in FIGS. 8 and 9, a pawl strip member 43, mounted to spindle 12 as heretofore described, has a pair of spaced apart portions of reduced cross-section, for example, cuts or score lines 44 and 45 which permit the pawls to accurately flex simultaneously in two directions with respect to the direction the pawl strip member 43 and the pawl portions thereof 46 and 47, extend from spindle 12. The presence of portions 44 and 45 allow the controlled and accurate flexing of pawls 46 and 47 in the manner described for the embodiment illustrated in FIGS. 6 and 7. This arrangement provides for a quieter operation by permitting a thinner cross-section in the areas at which the pawl is flexed, while the spindle provides support through the sides of slot 40 to compensate for the weakened areas resulting from portions 44 and 45 which necessarily have a thinner cross-section than the remainder of pawl strip member 43.

For use in a motor and support for window shades, it is preferred that the pawl strip member 39 of the present invention have a cross-sectional area, i.e. thickness, of from less than a few thousands of an inch to about 50 thousandths of an inch, with members of flexible metallic materials preferably having cross-sectional areas, at the lower portion of the range and members of flexible polymeric materials preferably having cross-sectional areas at the higher portion of the range. The strength of the pawl members can be varied by varying the width of the pawl. For example, for light weight shades in residential use, pawl widths of about one-quarter inch to about one-half inch are preferred, with widths of about one-quarter inch being more preferred; whereas for heavier shades and shades which are more frequently operated, pawl widths of one-half inch to about three-quarters inch or more are preferred, with widths of about one-half inch being more preferred. An example of a satisfactory flexible polymeric material is Eastman 4250G polypropylene available from Eastman Kodak Co., Rochester, N.Y., U.S.A.

FIGS. 8 and 9 further illustrate an embodiment of the present invention in which the annular portion 24 of housing 11 is formed with shallow recesses 48 having a ramp portion 49 at only one end of the surface of the shallow recess. Ramp portion 49 merges into a shoulder 50. The presence of ramp portion 49 at only one end of shallow recess 48 permits latching of pawls 46 and 47 following rotation in one direction only, the direction shown by arrow 51 against rotation in the direction opposite to that of arrow 51. Latching of pawls 46 and 47 occurs in the same manner as previously described. The presence of ramp portion 49 at only one end of the surface of recess 48 enables the housing and roller to be rotated, and hence the strip, e.g. shade, pulled down in a manner similar to operation of presently, commercially available shades. In operation, this embodiment allows latching in one direction only.

Various changes coming within the spirit of the invention may suggest themselves to those skilled in the art; hence, the invention is not to be limited to a specific embodiment shown and described or uses mentioned, but intend the same to be merely exemplary, the scope of the invention being limited only by the appended claims.

We claim:

1. An improved reversible locking clutch apparatus comprising
    a housing including an annular portion having a plurality of alternately deep and shallow recesses formed in the inner surface of the periphery of said portion, and
    a spindle having at least one flexible pawl extending therefrom and positioned to cooperate with the plurality of recesses of the annular portion of said housing, said pawl being unflexed when radially aligned with any of said deep recesses in the inner surface of the annular portion of said housing whereby relative rotation between the housing and said spindle can be initiated in either direction therefrom, and said pawl being angularly flexed upon being positioned in any of said shallow recesses in the inner surface of the annular portion of said housing and abutting the recess surface when the end of said pawl resides in said recess, whereby relative rotation between said housing and said spindle can be initiated in only one direction therefrom.

2. The apparatus defined in claim 1, wherein the deep recesses in the annular portion of said housing have a maximum depth, as measured from said spindle, greater than the length of said pawl as measured from said spindle, and the shallow recesses in said annular portion have a maximum depth, as measured from said spindle, less than the length of said pawl as measured from said spindle.

3. The apparatus defined in claim 1, wherein said spindle has a pair of flexible pawls extending radially therefrom, each pawl extending from diametrically opposite portions of the spindle surface.

4. The apparatus defined in claim 3, wherein each pawl has at least one portion of reduced thickness, whereby the flexibility thereof is enhanced.

5. The apparatus defined in claim 4, wherein each of the pawls has a pair of spaced apart transverse portions of reduced thickness, whereby the pawls may flex simultaneously in two directions with respect to the direction the pawl extends from the spindle.

6. The apparatus defined in claim 5, wherein said spindle has recesses in its surface adjacent each of said pawls, whereby the flexing of each pawl in at least one direction is limited by a side of the recess in the spindle adjacent thereto.

7. The apparatus defined in claim 3, wherein said pawls are integral with said spindle.

8. The apparatus defined in claim 3, wherein said pawls are formed of a single strip of flexible material positioned in an opening formed in said spindle.

9. The apparatus defined in claim 1, wherein the annular portion of said housing includes shoulders between adjacent recesses.

10. The apparatus defined in claim 9, wherein the surface of each shallow recess has a ramp at each end thereof merging into the shoulder intermediate its adjacent deep recess, said pawl end abutting a ramp adjacent its shoulder and preventing relative rotation between said housing and said spindle upon halting of the relative rotation in either direction with the end of the pawl residing in a shallow recess.

11. The apparatus defined in claim 1, wherein the surface of each shallow recess at at least one end thereof has a ramp merging into a shoulder intermediate an adjacent deep recess, said pawl end abutting a ramp adjacent its shoulder when residing in a shallow recess.

12. The apparatus defined in claim 11, wherein the shallow recesses each include only one ramp merging into a shoulder at the end thereof, said pawl abutting a ramp adjacent its shoulder upon halting of relative rotation between said housing and said spindle in the same direction that the ramp extends from the shallow recess with respect to the remainder of the recess with the end of the pawl residing in a shallow recess.

13. A motor and roller support for rolling and unrolling a strip comprising:
    a housing adapted to engage a terminal portion of a roller adapted to support a strip to be rolled and unrolled,
    said housing including an annular portion having a plurality of alternately deep and shallow recesses formed in the inner surface of the periphery of said portion.
    and a spindle axially received in said housing and having bracket-engaging means extending from one end thereof outwardly of said housing for supporting the roller, said spindle having means for rotatably retaining the spindle in said housing,
    said spindle having motor spring engaging means for cooperatively engaging a motor spring; and
    said spindle having at least one flexible pawl extending therefrom and positioned to cooperate with the plurality of recesses of the annular portion of said housing, said pawl being unflexed when radially aligned with any of said deep recesses in the inner surface of the annular portion of said housing whereby the housing may be rotated about said spindle in either direction therefrom, and said pawl being angularly flexed upon being positioned in any of said shallow recesses in the inner surface of the annular portion of said housing and abutting the recess surface when the end of said pawl resides in said recess, whereby the roller and housing may be rotated about said spindle in only one direction therefrom.

14. The motor and roller support defined in claim 13, wherein the deep recesses in the annular portion of said housing have a maximum depth, as measured from said spindle, greater than the length of said pawl as measured from said spindle, and the shallow recesses in said annular portion have a maximum depth, as measured from said spindle, less than the length of said pawl as measured from said spindle.

15. The motor and roller support defined in claim 13, wherein said spindle has a pair of flexible pawls extending radially therefrom, each pawl extending from diametrically opposite portions of the spindle surface.

16. The motor and roller support defined in claim 15, wherein each pawl has at least one portion of reduced thickness, whereby the flexibility thereof is enhanced.

17. The motor and roller support defined in claim 16, wherein each of the pawls has a pair of spaced apart transverse portions of reduced thickness, whereby the pawls may flex simultaneously in two directions with respect to the direction the pawl extends from the spindle.

18. The motor and roller support defined in claim 17, wherein said spindle has recesses in its surface adjacent each of said pawls, whereby the flexing of each pawl in at least one direction is limited by a side of the recess in the spindle adjacent thereto.

19. The motor and roller support defined in claim 15, wherein said pawls are integral with said spindle.

20. The motor and roller support defined in claim 15, wherein said pawls are formed of a single strip of flexible material positioned in an opening formed in said spindle.

21. The motor and roller support defined in claim 13, wherein the annular portion of said housing includes shoulders between adjacent recesses.

22. The motor and roller support defined in claim 21, wherein the surface of each shallow recess has a ramp at each end thereof merging into the shoulder intermediate its adjacent deep recess, said pawl end abutting a ramp adjacent its shoulder and preventing rotation of the housing with respect to said spindle upon halting of rotation of said housing in either direction with the end of the pawl residing in a shallow recess.

23. The motor and roller support defined in claim 13, wherein the surface of each shallow recess at at least one end thereof has a ramp merging into a shoulder intermediate an adjacent deep recess, said pawl end abutting a ramp adjacent its shoulder when residing in a shallow recess.

24. The motor and roller support defined in claim 23, wherein the shallow recesses each include only one ramp merging into a shoulder at the end thereof, said pawl abutting a ramp adjacent its shoulder upon halting of rotation of said housing in the same direction that the ramp extends from the shallow recess with respect to the remainder of the recess, with the end of the pawl residing in a shallow recess.

* * * * *

UNITED STATES PATENT AND TRADEMARK OFFICE
CERTIFICATE OF CORRECTION

PATENT NO. : 4,346,749

DATED : August 31, 1982

INVENTOR(S) : Buckley A. Singletary, et al

It is certified that error appears in the above-identified patent and that said Letters Patent is hereby corrected as shown below:

Column 8, line 58, after "portion" delete "." and insert -- , --.

Signed and Sealed this

Eighteenth Day of January 1983

[SEAL]

Attest:

GERALD J. MOSSINGHOFF

Attesting Officer

Commissioner of Patents and Trademarks